E. Yeoman,
Bed Bottom.
No. 4,180. Reissued Nov. 15, 1870.
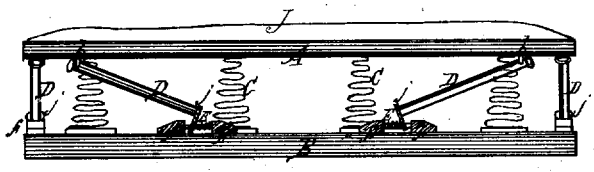
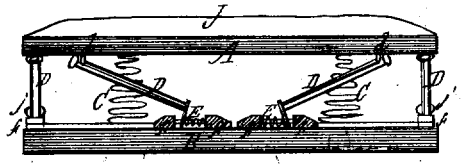
Witnesses
M. J. Flaherty
Wm H. Clarke
Inventor
Edward Yeoman
By his Attorney
G. L. Chapin
N. PETERS, PHOTO-LITHOGRAPHER, WASHINGTON, D. C.

United States Patent Office.

EDWARD YEOMAN, OF WAUKEGAN, ILLINOIS.

Letters Patent No. 67,698, dated August 13, 1867; reissue No. 4,180, dated November 15, 1870.

IMPROVEMENT IN BED-BOTTOMS.

The Schedule referred to in these Letters Patent and making part of the same.

*To all whom this may concern:*

Be it known that I, EDWARD YEOMAN, of Waukegan, in the county of Lake and State of Illinois, have invented a new and useful Improvement in Bed-Bottoms; and I do hereby declare that the following is a full, clear, and exact description thereof, reference being had to the accompanying drawing and letters marked thereon making a part of this specification, in which—

Figure 1 is a side elevation of my improved bed-bottom.

Figure 2, an end elevation of the same.

The nature of the present invention consists in the use of sliding spring braces to prevent a lateral and longitudinal motion of the upper section of the bottom, and to serve as a part of the spring support of the bed, the upper ends of the braces being jointed to one section of the frame, and the other ends being provided with suitable springs, allow the upper section of frame to have an easy vertical reciprocating movement, while, at the same time, it is held plumb over the lower section.

In order to give a correct understanding of my invention, I have marked corresponding parts with similar letters, and will now give a detailed description.

A B represent the upper and lower sections of an ordinary spring bed-bottom, covered in the usual manner with canvas, J. I represent this style of bottom as being better adapted to the application of my improvement than those of a different pattern.

D D D D represent what I term sliding spring braces, two of which are used on each side and end of the bottom, and they may be made of wood or metal, as may be most convenient and desirable, and should be long enough so that their lower ends will readily slide inwardly when weight is put on the upper section of the frame.

These braces D are pivoted to the upper section of frame at *h*, and their lower ends are provided with plates *i*, which have holes in them, and slide on rods E, and bear against springs coiled around said rods, which have supports in blocks *f f*, attached to lower section of frame.

I do not, however, confine myself to the peculiar kind of springs used, nor to the peculiar construction of guides at the bottom of braces, the object being fully attained if the braces have suitable guides where they slide on the frame, and are operated by springs of suitable strength to prevent the upper section from having a lateral motion, as described; nor is it necessary that the braces should be pivoted to the upper section of the frame, as they will operate equally as well if they be pivoted to the lower section and slide on the upper one.

From this description it will be seen that the frame A is thoroughly braced in every direction, and yet arranged so as to have the full benefit of the spiral springs C C, &c.

Having thus fully described my invention,

What I claim, and desire to secure by Letters Patent, is—

The sliding spring braces D, pivoted or jointed to one section of the frame A B, and operated by any suitable springs on the other section, when combined and arranged in a bed-bottom so as to slide and support the upper section, substantially as described.

EDWARD YEOMAN.

Witnesses:

G. L. CHAPIN,

D. HARRY HAMMER.